United States Patent
Sorin et al.

(10) Patent No.: US 9,052,463 B2
(45) Date of Patent: Jun. 9, 2015

(54) COUPLING OF A LASER SOURCE TO AN OPTICAL DATA DISTRIBUTING DEVICE

(75) Inventors: Wayne Sorin, Mountain View, CA (US); Sagi Mathai, Palo Alto, CA (US); Michael Tan, Menlo Park, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 74 days.

(21) Appl. No.: 13/384,861

(22) PCT Filed: Jun. 22, 2010

(86) PCT No.: PCT/US2010/039437
§ 371 (c)(1),
(2), (4) Date: Jan. 19, 2012

(87) PCT Pub. No.: WO2011/162745
PCT Pub. Date: Dec. 29, 2011

(65) Prior Publication Data
US 2013/0089289 A1    Apr. 11, 2013

(51) Int. Cl.
G02B 6/32 (2006.01)
G02B 6/43 (2006.01)
G06F 1/16 (2006.01)
G02B 6/42 (2006.01)

(52) U.S. Cl.
CPC ............... *G02B 6/32* (2013.01); *G02B 6/4204* (2013.01); *G02B 6/43* (2013.01); *G06F 1/16* (2013.01)

(58) Field of Classification Search
CPC ........................................................ G02B 6/32
See application file for complete search history.

(56) References Cited

U.S. PATENT DOCUMENTS

| 4,817,205 | A | | 3/1989 | Asawa |
|---|---|---|---|---|
| 5,241,616 | A | * | 8/1993 | Garcia .......................... 385/126 |
| 5,410,625 | A | * | 4/1995 | Jenkins et al. .................. 385/28 |
| 5,426,302 | A | * | 6/1995 | Marchman et al. ............... 850/6 |
| 6,253,004 | B1 | | 6/2001 | Lee et al. |
| 6,456,766 | B1 | * | 9/2002 | Shaw et al. ..................... 385/47 |
| 6,975,784 | B1 | * | 12/2005 | Xu et al. ......................... 385/14 |
| 7,477,809 | B1 | | 1/2009 | Tan et al. |
| 7,499,615 | B2 | | 3/2009 | Tan et al. |
| 2003/0185269 | A1 | | 10/2003 | Gutin |
| 2005/0031354 | A1 | * | 2/2005 | Ohashi et al. ................. 398/141 |
| 2009/0034906 | A1 | | 2/2009 | Tan et al. |
| 2009/0060432 | A1 | | 3/2009 | Sako et al. |

FOREIGN PATENT DOCUMENTS

JP          2009-223258          10/2009

* cited by examiner

*Primary Examiner* — Uyen Chau N Le
*Assistant Examiner* — Chad Smith
(74) *Attorney, Agent, or Firm* — Hewlett-Packard Patent Department

(57) ABSTRACT

A computer system has an optical data distributing device for transmitting and distributing optical signals. A laser source generates light for forming the optical signals, and an optical fiber with a graded index of refraction couples the light from the laser source to the optical data distributing device. A lens is disposed to image light generated by the laser source into an input end of the optical fiber. The magnification of the lens is selected as a function of a ratio of a numerical aperture and diameter of the laser source divided by a ratio of a numerical aperture and diameter of the optical fiber.

17 Claims, 4 Drawing Sheets

COUPLING OF A LASER SOURCE TO AN OPTICAL DATA DISTRIBUTING DEVICE

BACKGROUND

Conventional computer systems use buses made of electrical conductors to carry and distribute data signals between components of the computer systems. Electrical signal buses provide a means to construct a flexible communication structure to link various components of the computer system together. As the data rates of modern computer systems increase (e.g., into the 10 Gbps range), however, electrical signal buses are becoming inadequate due to their inability to maintain signal integrity in high-speed applications.

Recently, optical signal buses using optical waveguides or other types of optical data distributing devices have been shown to be an attractive solution for transmitting signals in high-speed electronics with high signal integrity. The operation of an optical bus requires laser sources, which need to be effectively coupled to the corresponding optical data distributing devices.

BRIEF DESCRIPTION OF THE DRAWINGS

Some embodiments of the invention are described, by way of example, with respect, to the following figures.

DETAILED DESCRIPTION

Figure 1:
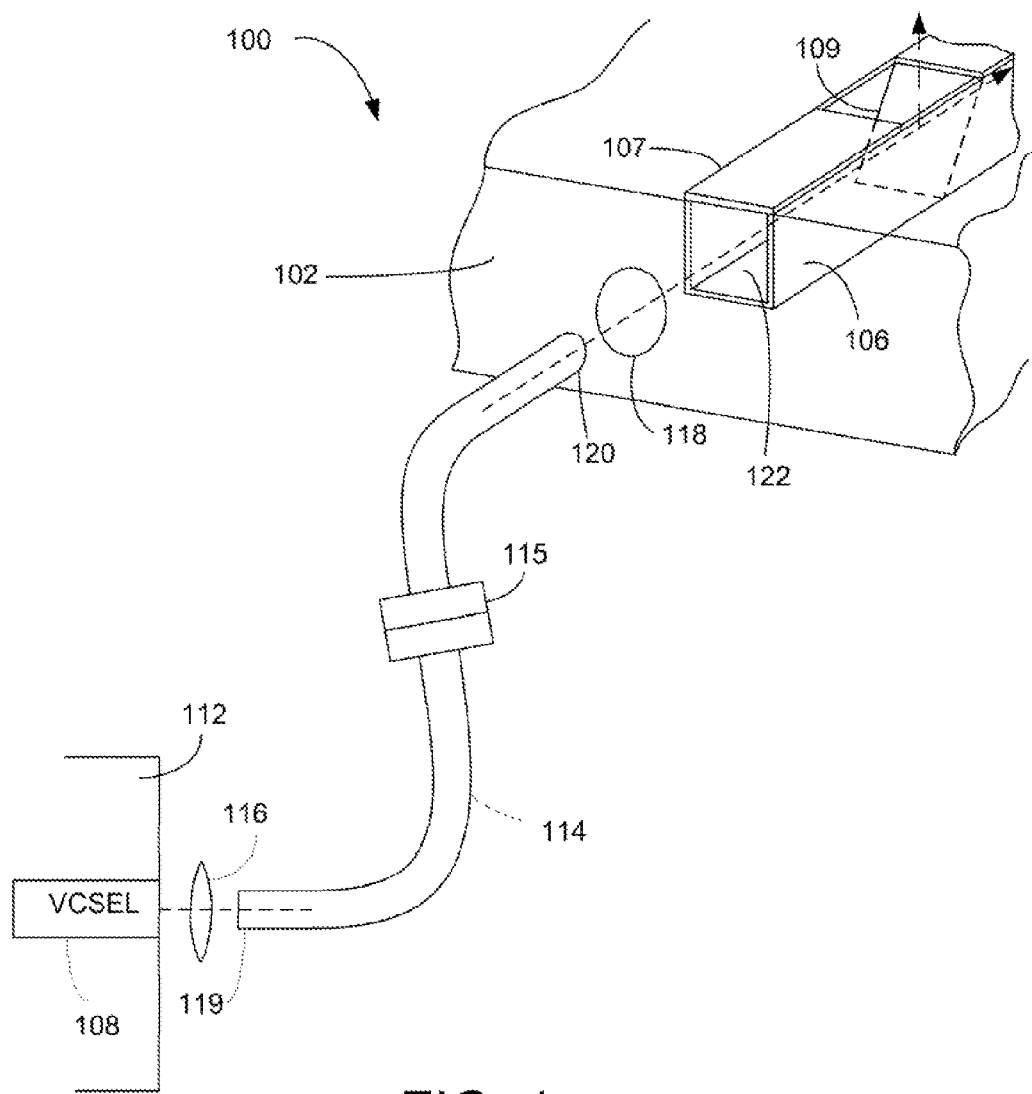
FIG. 1 is a schematic view of a portion of a computer system in an embodiment of the invention for coupling output light of a laser source to an optical data distributing device via a graded index fiber.

FIG. 1 shows a portion of a computer system 100 constructed in accordance with an embodiment of the invention for coupling a light source to an optical data distributing device for transmitting and distributing data signals optically. The optical data distributing device conducts optical data signals along a preselected path and distributes the data signals at multiple distribution points. One example of an optical data distributing device is, as will be described in greater detail below, an optical waveguide with beam splitters disposed therein at selected locations. Another example of an optical data distributing device is a power splitter plate that conducts light inside it in a zig-zag path and allows portions of the light to be transmitted out at selected reflection points.

In the illustrated embodiment of FIG. 1, the optical data distributing device is an optical waveguide 106 located in an optical backplane 102. The optical waveguide is in the form of a hollow metal waveguide, and the optical backplane 102 includes one or more such hollow metal waveguides for carrying light pulses as optical data signals. For clarity of illustration, only one optical waveguide 106 is shown in FIG. 1. Light pulses that constitute data signals are generated by a light source 108, which in the embodiment is a vertical-cavity surface-emitting laser (VCSEL). The laser source 108 may be on a computer line card 112 that can be inserted into a connection slot of the computer, while the optical backplane 102 may be on a computer rack or shelf. The output of the laser source 108 is flexibly coupled to the hollow metal waveguide 106 by means of an optical fiber 114 and appropriate optical imaging components such as lenses 116 and 118. The optical fiber 114 does not have to be a single continuous piece and may optionally have multiple segments joined together by suitable connectors 115, as shown in FIG. 1. The optical coupling on either end of the optical fiber 114, i.e., between the laser source 108 and the input end 119 of the fiber or between the output end 120 of the fiber and the hollow metal waveguide 106, may be implemented using a suitable mechanical connector arrangement that provides alignment adjustment capabilities. The properties of the hollow metal waveguide 106, the laser source 108, the optical fiber 114, and how the optical components are selected to enhance optical coupling from the laser source to the hollow metal waveguide, will be described in greater detail below.

The hollow metal waveguide (HMWG) 106 is generally a hollow air-core light pipe that has its walls coated with a metal layer that is highly reflective to the light being transmitted. In some embodiments, the hollow metal waveguide 106 has a generally rectangular (including square) cross section, and in some other embodiments the hollow metal waveguides may have a circular or elliptical cross section. In the embodiment illustrated in FIG. 1, the waveguide 106 has a generally square cross section. The dimensions of the hollow metal waveguide would depend on factors such as the wavelength of the light to be transmitted, expected propagation loss, alignment requirements, etc. For instance, for a light wavelength of 850 nm, the width and height of the square hollow metal waveguide 106 may be selected to be 150 microns. The hollow metal waveguide 106 may be fabricated, for instance, by first forming a groove in a substrate, and coating the groove with a reflective metal layer. The groove may be formed, for instance, by cutting into the substrate (e.g., Si) with a dicing saw, or by patterning and etching the substrate, or by shaping the substrate (e.g., plastic) using an imprinting or molding method. A top plate 107 in the form of a metal sheet may then be added to cover the coated groove to form the air-core light pipe with a closed cross section 122. Light is guided in the interior cross section of the waveguide 106, and the metal-coated walls act as a reflective or high-index layer that bounces the rays of the optical signals at near grazing incidence. Beam splitters 109 may be inserted into the groove of the waveguide 106 at a selected angle (e.g., 45 degrees) and locations for tapping the transmitted signals, and corresponding openings may be formed in the top plate 107 to allow light reflected by the beam splitters to pass through and be received by respective communication modules.

A hollow metal waveguide has several interesting properties. Propagation loss of light in the hollow metal waveguide can be made very low, such as less than 0.05 dB/cm. The hollow metal waveguide can have a low numerical aperture (NA), less than 0.01, and has an effective index of around 1. The hollow metal waveguide is easy to fabricate. These properties make the hollow metal waveguide suitable for use in transmitting high-speed optical data signals.

The use of the optic fiber 114 to couple the output of the laser source 108 to the hollow metal waveguide 106 provides significant flexibility in the positioning and connection arrangement of the laser source 108 and the optical backplane 102. For instance, the laser source 108 and the optical backplane 102 may be located at different height levels, and the output axis of the laser source may have an orientation different from that of the input axis of the hollow metal waveguide 106. The connection flexibility is provided without sacrificing the precise alignments required to efficiently project the optical signals from the laser source 108 into the hollow metal waveguide 106. In contrast, without the flexible coupling provided by the fiber 114, the laser source 108 would have to be positioned to direct its output directly into the hollow metal waveguide 106. The precise alignment required for such a configuration would be very difficult and expensive to achieve. Also, the direct coupling would take away largely the flexibility in the physical positioning and connection figuration of the laser source relative to the optical backplane. For instance, it would be desirable to locate the laser on a computer line card that is detachable from the optical backplane, but the direct coupling might not allow for an easily detachable mechanical coupling mechanism.

A major consideration in using an optical fiber to couple the laser output to an optical data distributing device in the optical backplane is to minimize the losses associated with the coupling. In typical data communication applications, a multimode fiber (MMF) might be used to transmit data signals optically. A typical multi-mode fiber, however, has a high numerical aperture (NA) that is a mismatch with the hollow metal waveguide and would cause a high propagation loss of the light coupled into a hollow metal waveguide. Also, for typical data communication applications, it is desirable to uniformly couple into all the modes of the multimode fiber. Such an optical coupling would, however, increase the optical loss when the output of the multimode fiber is sent into the hollow metal waveguide. Although using a single-mode fiber (SMF) to couple light into the hollow metal waveguide would allow for a low input NA and could result in a lower propagation loss, such an approach is expensive since it requires very tight tolerances in the coupling from the laser to the single-mode fiber. Moreover, laser sources such as the VCSEL typically have multiple modes, and they would have very poor coupling into a single-mode fiber.

This need to provide efficient coupling to minimize the propagation loss in the hollow metal waveguide is effectively addressed by the use of a graded-index fiber (GIF) 114 to couple the light from the laser source 108 to the hollow metal waveguide 102. In a graded index fiber, the index of refraction of the core is the highest at the center axis and decreases toward the outer diameter of the fiber core. The variation of the index of refraction may be in a quadratic form, i.e., the index value is proportional to substantially (but maybe not exactly) the square of the distance from the core center. As a result of the index gradient, the probability of mixing of the lower modes of the fiber with higher modes when the light propagates through the fiber is much reduced as compared to step-index multi-mode fibers.

Figure 2:
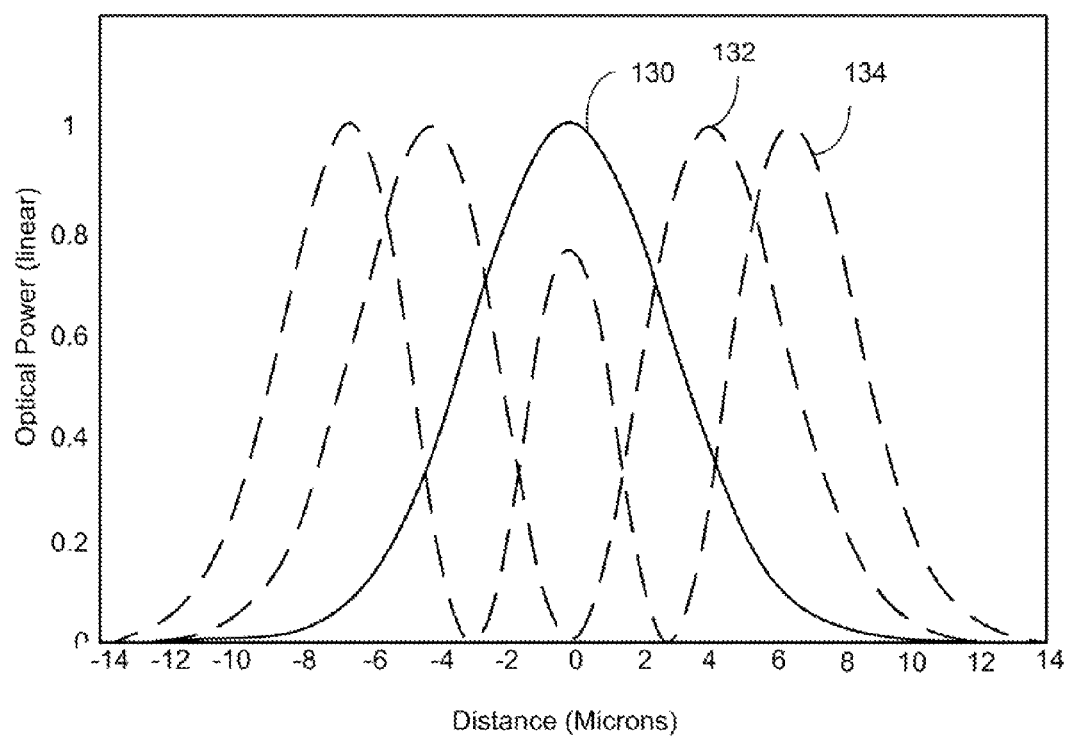
FIG. 2 is a chart showing the spatial distribution of several lowest-order modes of a graded index fiber.

FIG. 2 shows, as an example, the distribution of the optical power of the lowest three modes of a graded index fiber as a function of the distance from the core axis of the fiber. In this example, the fiber has a 50 micron core diameter and an NA of 0.2 radians. The wavelength of the light to be transmitted depends on the particular applications and may be, for example, 850 nm, which is commonly used for optical data communications. The profile of the graded index of the fiber has a substantially quadratic shape as a function of the distance from the fiber center. These three lowest modes are designated $m_0$, $m_1$, and $m_2$, respectively. In FIG. 2, the power curve 130 of the $m_0$ mode, which is the lowest or fundamental mode of the fiber, has a power peak at the center of the core. In contrast, the power curve 132 for the $m_1$ mode and the power curve 134 for the $m_2$ modes have two and three peaks, respectively, across the diameter of the fiber core. Generally, the lowest modes of the graded index fiber with a quadratic index variation have the profiles of the Hermite Gaussian modes. In this example, the approximate diameter for the three modes is about 20 microns, while the approximate diameter of the fundamental mode $m_0$ is about 10 microns.

To provide an effective transfer of light from the laser source 108 to the graded index fiber 114, the image of the laser output is coupled to the input end 119 of the fiber with appropriate image magnification. As used herein, the word "magnification" means broadly that the image size is adjusted to become either larger or smaller. In this regard, the magnification Mg is determined by:

$$Mg = \sqrt{\frac{Df}{NAf}\frac{NAs}{Ds}}$$

Where Df is the diameter of optical fiber, Ds is the diameter of the laser source, NAs is the numerical aperture of the laser source, and NAf is the numerical aperture of the optical fiber.

Generally, with the magnification selected this way, the light spot of the laser output when projected onto the input end of the fiber would have a proper size for matching to the lowest order modes of the graded index fiber 114. As a result, the diameter of the light spot (or the spot size) remains approximately the same as the light travels through the optical fiber. If the laser light spot is not properly projected into the fiber, the light spot size in the fiber will tend to undulate as a function of distance with large variations, which would make matching with the downstream optical data distributing device very difficult. With the proper magnification, good matching can be relatively easily achieved to provide effective coupling. In some embodiments, the matching may be made to be within 10%, and in some other embodiments the matching may be made to be within 5%.

In some embodiments, such as shown in FIG. 1, the laser source is a vertical-cavity surface-emitting laser (VCSEL). The output power of a VCSEL is mostly contained in several lowest modes that can also be described using Hermite Gaussian modes. With proper magnification, the output of the laser 106 will be projected mostly into the corresponding lowest modes of the fiber, without exciting significantly the higher modes of the fiber. As mentioned above, the mixing of the lowest modes of the fiber with the higher modes during propagation in the fiber is relatively low. It has been found experimentally that the power remains in the lowest order modes of the GIF even when the fiber is bent tightly or roughly handled. As a result, the product of the spot size of the beam and the numerical aperture is substantially preserved while travelling through the fiber. This allows optimal coupling of the fiber output into the hollow metal waveguide 106, since it allows for the largest magnified spot size while still minimizing the beam divergence (i.e., NA). This coupling solution can be effectively used to couple laser sources to hollow metal waveguides over distances of several meters.

To efficiently couple the light from the output end of the fiber 114 into the hollow metal waveguide 106, a lens 118 is used to provide an appropriate magnification. As mentioned above, light travels down the hollow metal waveguide and bounces off the walls of the waveguide. To reduce the transmission loss, it is desirable to keep the incidence angle of the light on the walls small. This means that the light output from the optical fiber 114 should be imaged into the waveguide 106 with a smallest numerical aperture (NAwg) while keeping the spot size within a largest desirable diameter (Dwg), which depends on the dimensions of the waveguide. For instance, if the waveguide 106 had a width and height of 150 μm, then Dwg may be set to be 110 μm. The magnification of the lens 118 is then selected to match the output light spot diameter (Dfo) of the fiber with the largest desirable light spot diameter of the waveguide:

$$Wg = \frac{Dwg}{Dfo}$$

Figure 3:
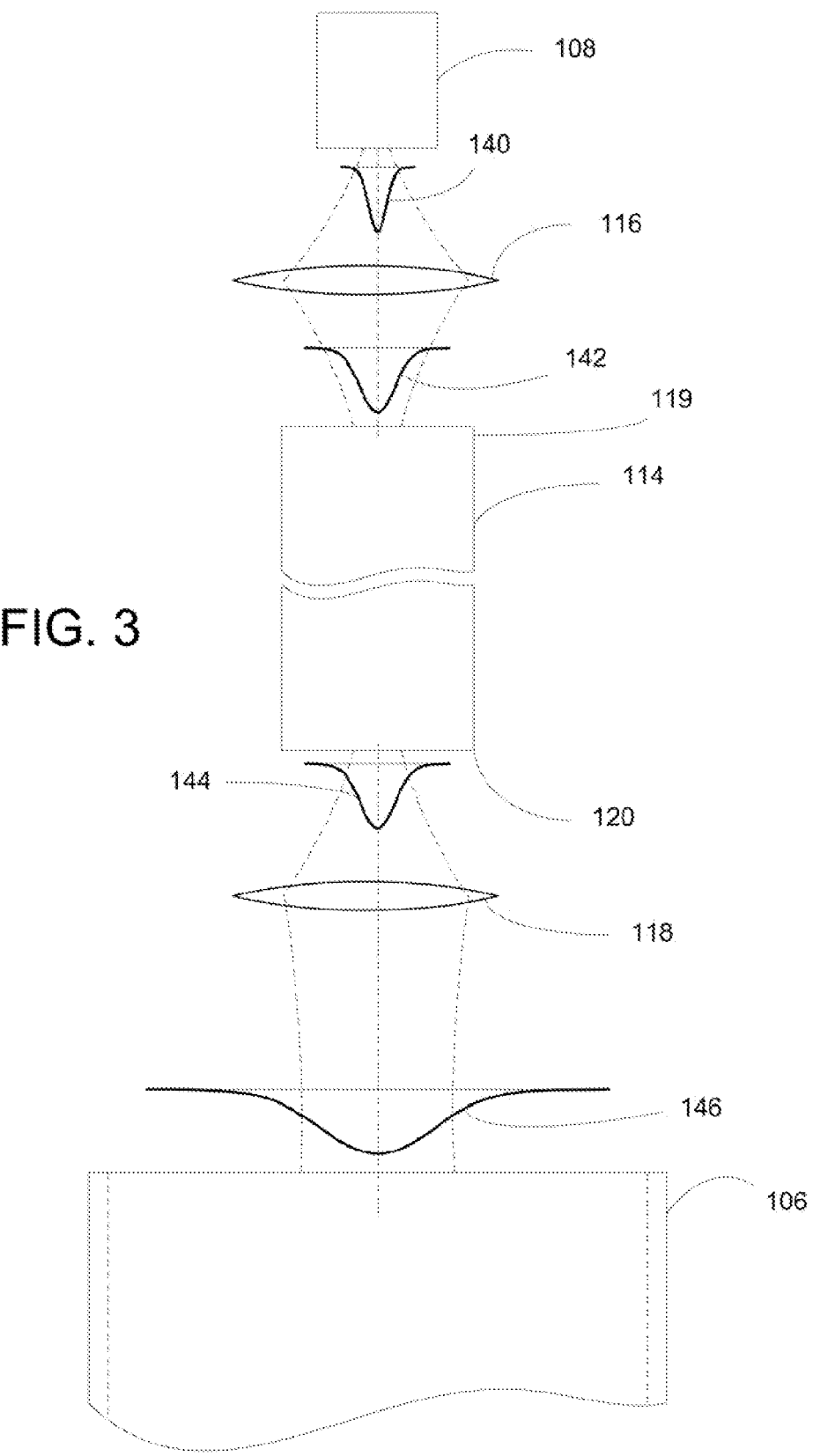
FIG. 3 is a schematic diagram showing the transfer of light generated by a laser source into a hollow metal waveguide by means of a graded index fiber in one embodiment of the invention.

The image matching from the laser 108 all the way to the hollow metal waveguide 106 as described above is illustrated in FIG. 3. For clarity of illustration, only the fundamental mode of the light beam is shown in the images at different stages of the light coupling, but it should be understood that other lowest modes also exist in the actual images. By way of example, the output of the laser source 108 may have a diameter of 9 μm and a numerical aperture of 0.25, and the graded index fiber 114 may have a diameter of 50 μm and a numerical aperture of 0.2. In that case, the magnification Mg of the lens 116 is $$\sqrt{\left(\frac{50}{0.2}\right)\left(\frac{0.25}{9}\right)} \cong 2.64$$

The spot size of the light image 142 into the optical fiber 114 can then be determined as 9 μm*2.64≅23.7 μm. This spot size is roughly maintained through the optical fiber 114, so the spot diameter Dfo in the output image 144 is also about 23.7 μm. The hollow metal waveguide has a width and height of 150 μm and a largest desirable spot diameter of 110 μm. Thus, the lens 118 may be selected to provide a magnification of 110/23.7≅4.6 so that the spot size is about 110 μm in the image 146.

Figure 4:
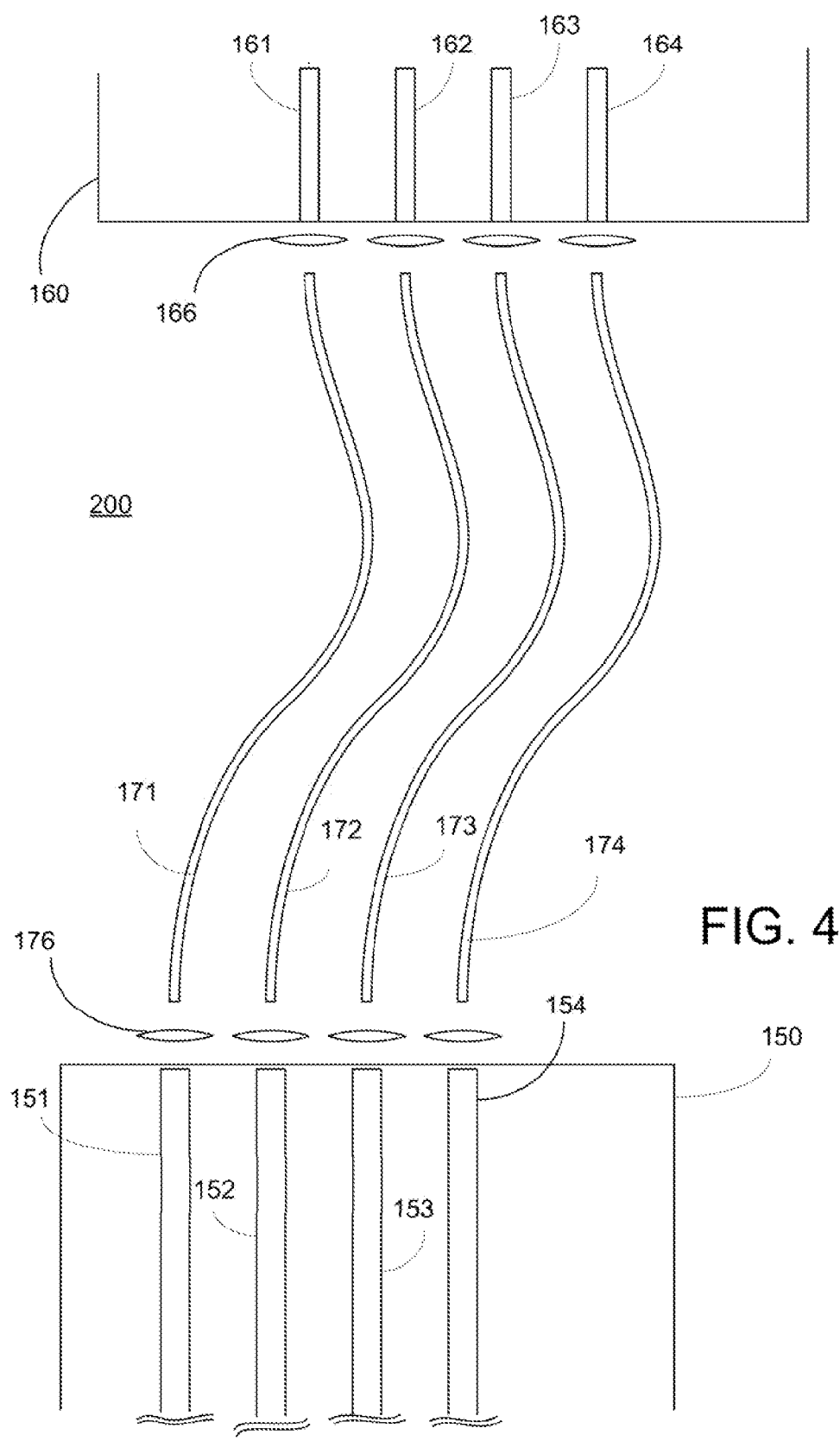
FIG. 4 is a schematic view of a portion of a computer system of an embodiment of the invention that has an array of lasers coupled by optical fibers to a corresponding array of hollow metal waveguides.

The coupling solution described above can be used in an array configuration to provide parallel transfer of the output light of multiple lasers into multiple optical data distributing devices. FIG. 4 shows an example of a computer system 200 with such an arrangement. In this example, there are four hollow metal waveguides 151, 152, 153, 154 formed in the optical backplane 150. It should be noted, however, that more hollow metal waveguides may be used depending on the desired data transmission capacity. Also, the hollow metal waveguides do not have to be limited to a single plane, and may be formed in multiple stacked planes to form a two-dimensional array. A corresponding number of laser sources 161, 162, 163, 164, four VCSEL's in this embodiment, generate the optical signals to be transmitted through the hollow metal waveguides. The laser sources are on a computer line card 160. Similar to the hollow metal waveguides, the laser sources can also be formed in a one-dimensional or two-dimensional array. The output of the laser sources are coupled into corresponding graded index fibers 171, 172, 173, 174 by means of an array 166 of micro lenses, with each micro lens disposed between a laser source and an input end of a corresponding graded index fiber. The micro lenses in the array 166 provide a magnification selected to match the fundamental mode of each laser source with the fundamental mode of the corresponding graded index fiber. A second array of 176 micro lenses is used to couple the light coming through the output ends of the fibers 171-174 into the corresponding hollow metal waveguides 151-154 on the optical backplane 150. The magnification of the micro lenses in the array 176 is selected to match the spot size of each fiber to the largest desirable spot size of the corresponding hollow metal waveguide. Similar parallel array configuration can also be used to couple an array of laser sources to other types of optical data distributing devices, such as the power splitter plate with a zig-zag light path mentioned earlier.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computer system comprising:
    a laser source for generating light beams for forming optical signals;
    an optical data distributing device that includes a hollow metal optical waveguide with beam splitters for transmitting and distributing optical signals;
    an optical fiber for coupling the light beams generated by the laser source into the optical data distributing device, the optical fiber core having a graded index of refraction; and
    a first lens disposed between the laser source and an input end of the optical fiber for imaging light from the laser source into the optical fiber, the first lens to magnify the light beams such that the fundamental mode of the magnified light beams matches the fundamental mode of the optical fiber, the magnification being set based on a ratio of a numerical aperture and a diameter of the laser source divided by a ratio of a numerical aperture and a diameter of the optical fiber.

2. A computer system as in claim 1, wherein the laser source is a vertical-cavity surface-emitting laser.

3. A computer system as in claim 2, wherein the optical fiber has a quadratic index profile.

4. A computer system as in claim 2, wherein the laser source generates light with a wavelength of 850 mm.

5. A computer system as in claim 1, further including a second lens disposed between an output end of the optical fiber and an entrance of the optical waveguide for imaging light transmitted by the optical fiber into the optical waveguide.

6. A computer system as in claim 5, wherein the second lens has a magnification selected to match an output spot size of the optical fiber with a desired spot size of the optical waveguide that matches the fundamental mode of the optical fiber.

7. A computer system as in claim 1, wherein an output spot size of the optical fiber corresponds to the fundamental mode of the laser source.

8. A computer system as in claim 1, wherein diameter of the optical fiber core is approximately 50 microns.

9. A computer system as in claim 1, wherein each of the height and width of the hollow waveguide is approximately 150 microns.

10. A computer system comprising:
    a line card having an array of laser sources;
    an optical backplane having a plurality of hollow metal optical waveguides with beam splitters for transmitting optical signals;
    a plurality of optical fibers disposed between the laser sources and the optical waveguides for flexibly coupling light beams generated by the laser sources into corresponding optical waveguides, each optical fiber core having a graded index of refraction; and a first array of micro lenses disposed between the laser sources and the optical fibers for imaging light beams generated by the laser sources into corresponding optical fibers, the micro lenses to magnify the light beams such that at least one of three lowest modes of the magnified light beams matches a respective at least one of three lowest modes of the optical fibers, the magnification being based on a ratio of a numerical aperture and a diameter of each laser source divided by a ratio of a numerical aperture and a diameter of a corresponding optical fiber.

11. A computer system as in claim 10, wherein each of the optical fiber has a quadratic index profile.

12. A computer system as in claim 10, wherein the laser sources are vertical-cavity surface-emitting lasers.

13. A computer system as in claim 12, wherein the laser sources generate light with a wavelength of 850 nm.

14. A computer system as in claim 10, further including a second array of micro lenses disposed between output ends of the optical fibers and corresponding optical waveguides for imaging light transmitted by the optical fibers into the corresponding optical waveguides.

15. A computer system as in claim 14, wherein the micro lenses in the second array have a magnification selected to match an output spot size of each optical fiber with a desired spot size of a corresponding optical waveguide.

16. A computer system as in claim 10, wherein an output spot size of the optical fiber corresponds to at least one of three lowest modes of the magnified light beams.

17. A computer system comprising:
a multimode laser source for generating light for forming optical signals;
an optical data distributing device that includes a hollow metal optical waveguide with beam splitters for transmitting and distributing optical signals;
a multimode optical fiber for coupling the light generated by the laser source into the optical data distributing device, the optical fiber core having a graded index of refraction with a quadratic index profile having a highest index of refraction at the center axis of the optical fiber core and decreasing toward the outer diameter of the optical fiber core; and
a first lens disposed between the laser source and an input end of the optical fiber for imaging light from the laser source into the optical fiber, the first lens to magnify the light beams such that the fundamental mode of the magnified light beams matches the fundamental mode of the optical fibers.

* * * * *